Oct. 2, 1956  T. H. JOHNSON ET AL  2,764,936
BLANKET CLAMPS
Filed May 29, 1953  5 Sheets-Sheet 1
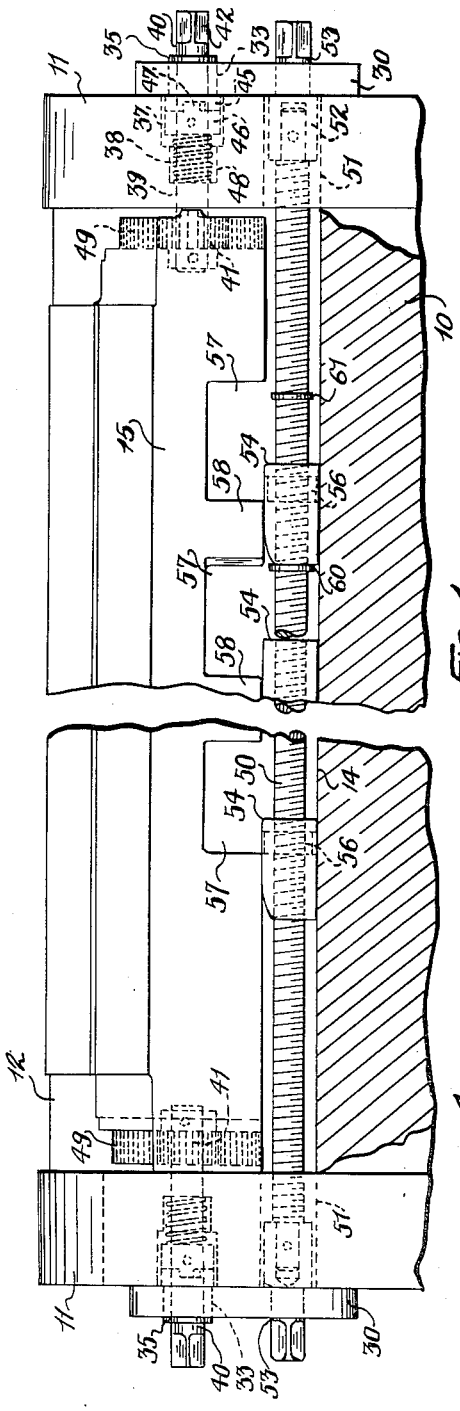
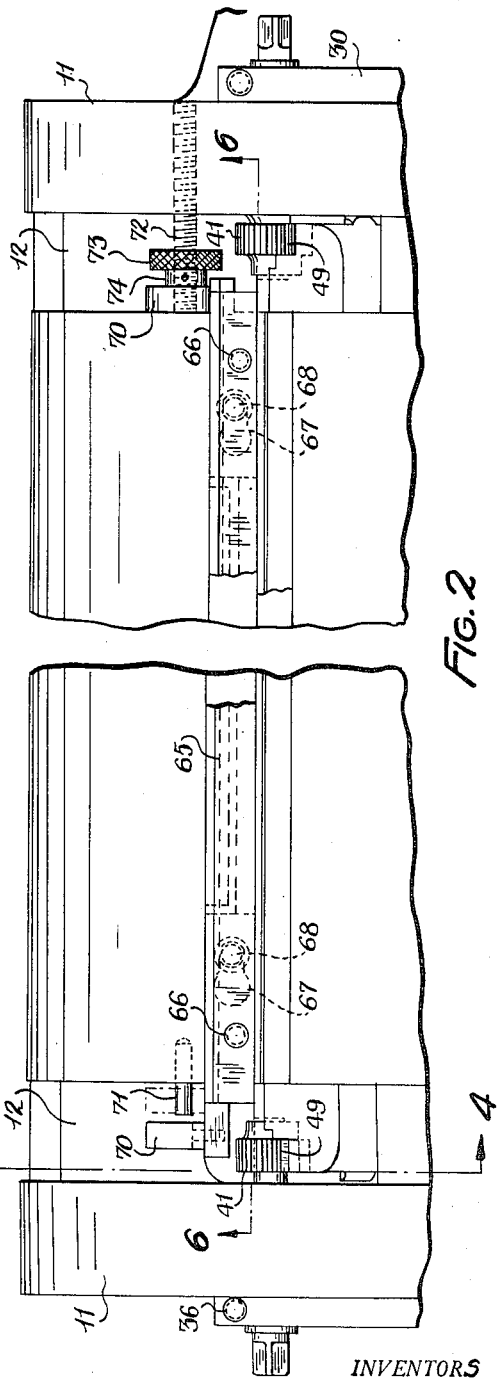
INVENTORS
THOMAS H. JOHNSON
BY ANTHONY J. MUELLER
Hudson, Boughton
Williams, David & Hoffmann
ATTORNEYS Oct. 2, 1956 T. H. JOHNSON ET AL 2,764,936
BLANKET CLAMPS
Filed May 29, 1953 5 Sheets-Sheet 2

INVENTORS
THOMAS H. JOHNSON
BY ANTHONY J. MUELLER
Hudson, Boughton,
Williams, David & Hoffmann
ATTORNEYS Oct. 2, 1956
T. H. JOHNSON ET AL
2,764,936
BLANKET CLAMPS
Filed May 29, 1953
5 Sheets—Sheet 3
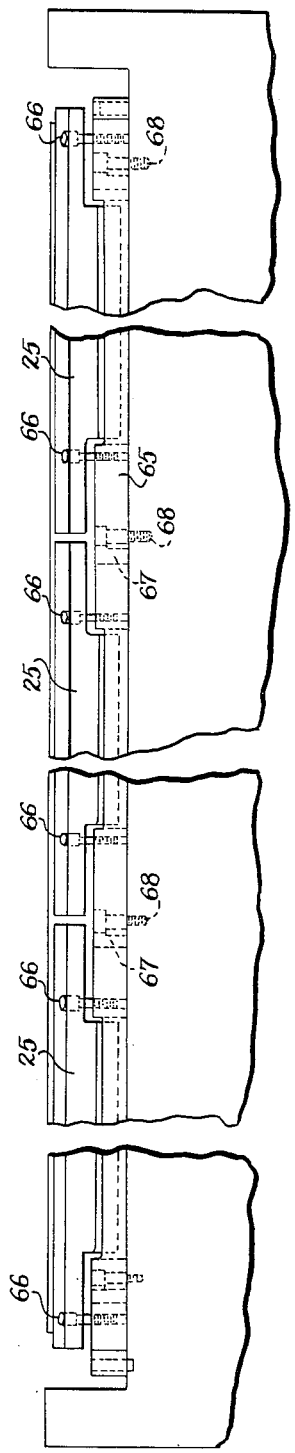
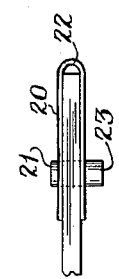
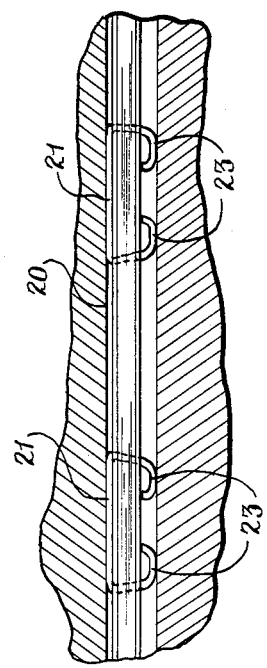
INVENTORS
THOMAS H. JOHNSON
BY ANTHONY J. MUELLER
Hudson, Boughton,
Williams, David & Hoffmann
ATTORNEYS

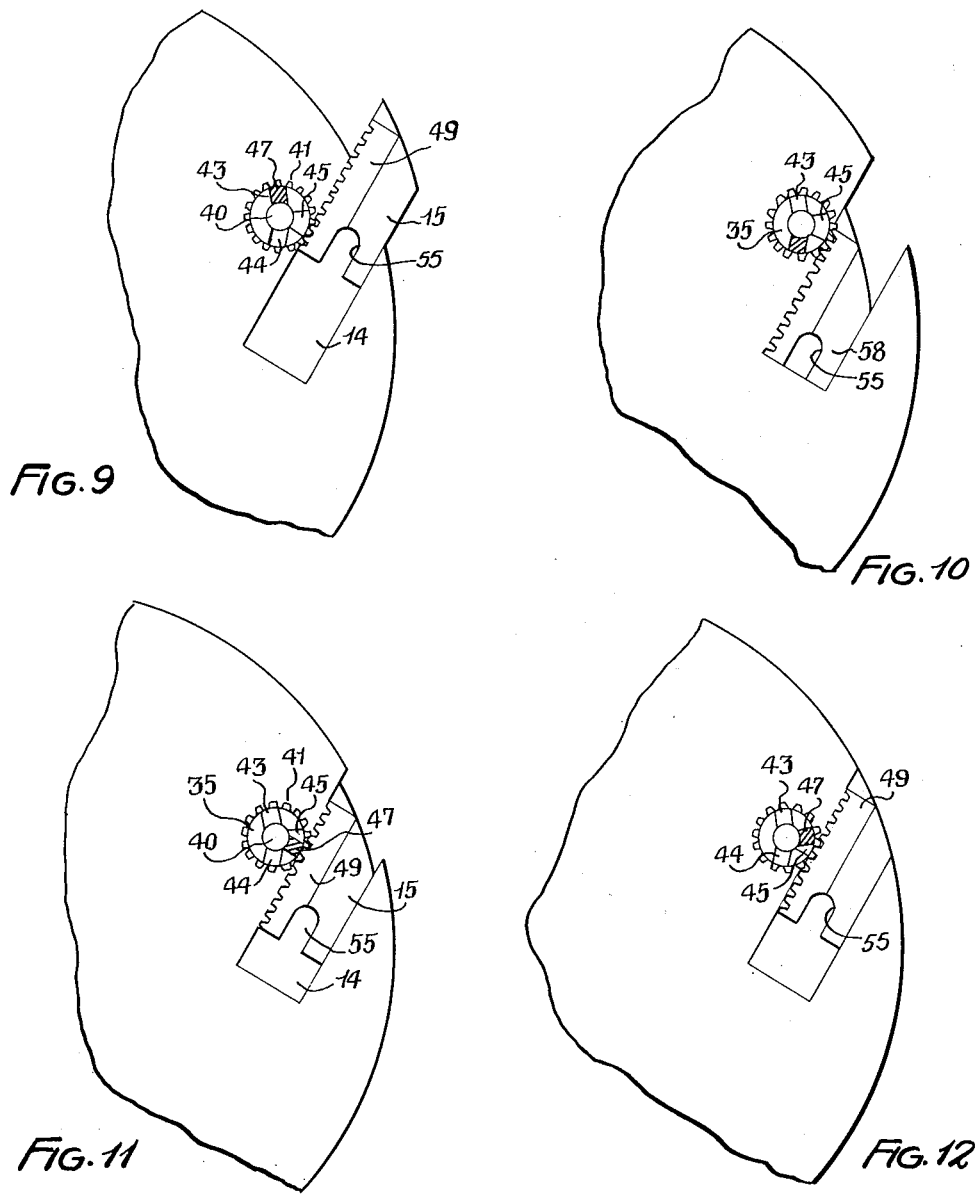

United States Patent Office 2,764,936
Patented Oct. 2, 1956

2,764,936

BLANKET CLAMPS

Thomas H. Johnson, Peninsula, and Anthony J. Mueller, Cleveland, Ohio, assignors to Harris-Seybold Company, Cleveland, Ohio, a corporation of Delaware Application May 29, 1953, Serial No. 358,322

15 Claims. (Cl. 101—415.1)

This invention relates to improvements in blanket clamps, more particularly means for clamping a flexible blanket to the blanket cylinder of an offset printing press of the type in which the blanket should cover approximately the entire surface of the cylinder, as for example the blanket cylinder of a web offset press.

One of the objects of the invention is the provision of a method of mounting a blanket on a cylinder in a manner to cover substantially the complete surface thereof, involving attaching the ends of the blanket one at a time to lengthwise bars movable inwardly and outwardly in slots formed in the cylinder, which slots meet in the surface of the cylinder at an acute angle, the method involving further retracting one bar into the cylinder below the surface thereof to provide slack enabling the operator to pull the other end of the blanket around far enough to attach it to the other bar, which is then retracted into the cylinder sufficiently to clear the path of the first bar, after which the first bar may be forced outwardly to a position flush with the cylinder surface, thereby tensioning the blanket and covering the second bar and its slot.

Another object is the provision of clamping means which is so constructed and arranged that the blanket may be properly tensioned to encircle the cylinder snugly and evenly and completely enclose the same.

Another object is the provision of means for the purpose stated which enables the operator to attach the ends of the blanket one at a time to blanket anchoring bars which are movable inwardly and outwardly in slots formed in the cylinder, each anchoring bar being movable inwardly into the cylinder to clear the path of the other bar, and the two bars being so formed that in their final position the ends of the blanket at the surface of the cylinder come approximately together.

Another object is the provision of rack and pinion means for moving one of the said anchoring bars, hereinafter called the slide bar, and latching it in three different positions, namely an outwardly projecting position for convenience in attaching one end of the blanket thereto, a second position where it is retracted within the cylinder sufficiently to clear the path of movement of the other bar, and an intermediate position slightly beneath the surface of the cylinder.

A further object is the provision of means for forcing the slide bar outwardly from its said intermediate position to a position in which it is flush with the cylinder surface and in which the blanket is tensioned.

Still another object is the provision of a bar, hereinafter called a mounting bar, which comprises one or more blanket mounting strips disposed in the same slot and adjustably connected with the main part of the bar for varying the degree of tension in the blanket.

Other objects and features of novelty will appear as we proceed with the description of that embodiment of the invention which, for the purposes of the present application, we have illustrated in the accompanying drawings, in which:

Fig. 1 is an elevational view, partly in section on the line 1—1 of Fig. 3, of a fragment of a blanket cylinder embodying the invention, the blanket being omitted, this view illustrating particularly the slide bar operated by rack and pinion and the wedging means for final actuation of the slide bar;

Fig. 2 is an elevational view of a fragment of the cylinder illustrating particularly the mounting bar to which the opposite end of the blanket is attached;

Fig. 6 is a view showing the mounting bar and associated parts in elevation, the view being taken substantially on the line 6—6 of Fig. 2 with certain parts omitted;

Fig. 7 is a detail sectional view on a larger scale taken substantially on the line 7—7 of Fig. 5 showing provision at a blanket end for enabling it to be anchored;

Fig. 8 is a view of the same looking in the direction of arrow 8, Fig. 7;

Figs. 9 to 12 inclusive are diagrammatic views showing successive positions of rack and pinion means and the slide bar to which the rack is attached, first in extended position for facilitating the mounting of a blanket end thereon, second in fully retracted position for clearing the slot in which the mounting bar is mounted, third an intermediate position in which the slide bar is moved outwardly to a point somewhat beneath the surface of the cylinder and fourth the final position to which it is wedged outwardly flush with the surface of the cylinder;

Figs. 13 to 17 inclusive are diagrammatic views showing the relative positions of the two blanket gripping bars in successive positions, first where the slide bar is projected outwardly to facilitate the mounting of a blanket end therein, second where the slide bar is retracted into the cylinder to clear the path of the mounting bar, third where the mounting bar is projected to receive the opposite end of the blanket, fourth where the slide bar is projected outwardly by its rack and pinion means to a point somewhat beneath the surface of the cylinder and fifth where the slide bar is wedged outwardly to final position flush with the cylinder surface, bringing the two ends of the blanket into close juxtaposition.

Figure 3:
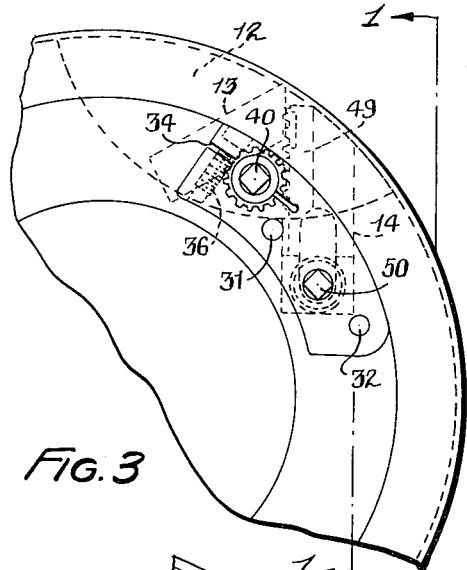
Fig. 3 is a fragmental end view of the cylinder looking in the direction of arrow 3 of Fig. 1.
Figure 4:
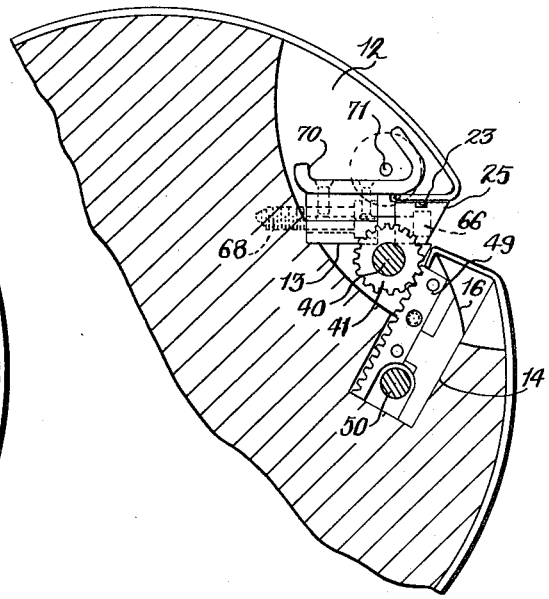
Fig. 4 is a fragmental cross-sectional view taken substantially on the line 4—4 of Fig. 2.

In the drawings a blanket cylinder such as may be used in a web offset press is shown at 10. It has conventional bearers 11 at its ends and a shaft which is rotated by suitable gearing, not herein shown. Adjacent the bearers and outwardly of the blanket supporting main portion of the cylinder there are cavities 12, see especially Figs. 3 and 4. In the body of the cylinder aligned with cavities 12 there are two slots 13 and 14 which extend from one cavity 12 to the other. These slots are disposed at an acute angle to each other. As shown herein this angle is approximately sixty degrees. It should be understood however that these slots may be disposed at other angles, although an angle greater than ninety degrees would leave thin sections outwardly of the slots which might unduly weaken the cylinder at those points.

These slots will be hereinafter referred to as "chordal slots" which is intended to signify that they extend along or straddle planes parallel to the cylinder axis but not through the axis. The slot 13 may approach a radial position somewhat more than as illustrated herein.

Figure 5:
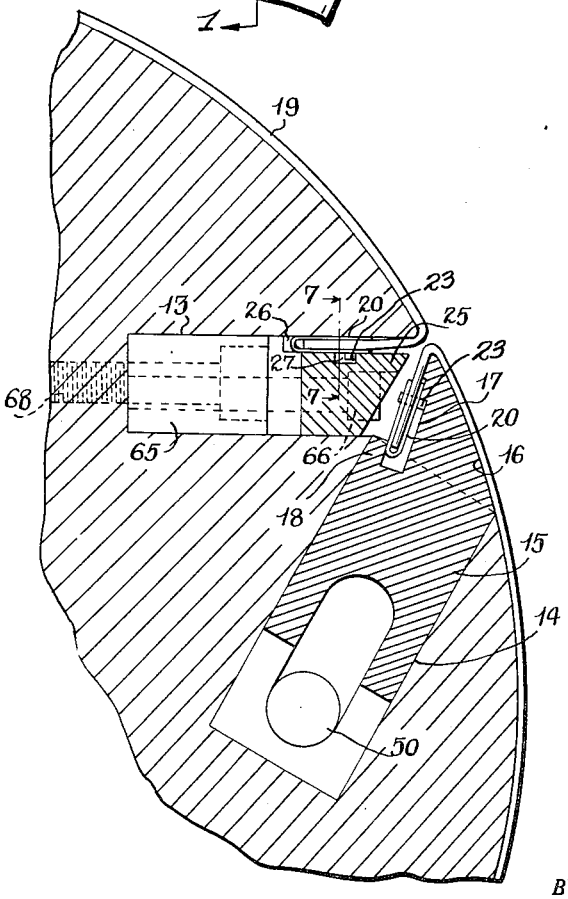
Fig. 5 is a fragmental cross-sectional view on a larger scale illustrating the blanket in operative position on the cylinder and the blanket gripping elements in final or working position.

In the slot 14 there is mounted a slide bar 15 which in the operating condition of the cylinder occupies the position illustrated in Fig. 5. The surface 16 at the outer end of this slide has curvature conforming to that of the cylinder surface, and thus provides a smooth and solid backing for the blanket which constitutes a continuation of the cylinder itself. On the side of the slide bar 15 nearest the slot 13 there is provided a stepped groove 17 which extends inwardly far enough to leave a shoulder 18 on that side of the bar.

The blanket, which is indicated at 19, may be of the usual type employed on offset cylinders, except that its end edges are finished in a novel manner, that is to say each end edge is provided with a sheet metal binding 20, see particularly Figs. 7 and 8, the sides of which are pressed tightly against the blanket. Then staples 21 made from round or flat wire are driven through the binding and the blanket enclosed thereby. These staples are spaced evenly from the folded edge 22 of the binding so as to be disposed in alignment parallel to the end of the blanket. The staples are driven by a commercial form of stapling machine which provides rebent legs 23 that project an appreciable distance beyond the surface of the adjacent side of the binding and form conjointly a projecting abutment extending throughout substantially the entire length of the blanket edge. One end of the blanket thus equipped with the staple abutment is mounted in the slide 15 by inserting the bound edge of the blanket beneath the shoulder 18 of the slide bar and causing the staple legs 23 to engage behind a step in the groove 17, as shown clearly in Fig. 5 of the drawing.

The other end of the blanket has a similar metal binding 20 provided with staples 21, although the staples are driven from the opposite side of the blanket. In the slot 13 there are a series of mounting strips 25 slidable together in the slot but provided with a rabbet 26 of sufficient depth to accommodate the binding 20 on the blanket and with a groove 27 opening into the rabbet to accommodate the staple legs 23. The legs 23 engaging the outer wall of groove 27 hold that end of the blanket in place, assuming that the strips 25 are secured in the position of Fig. 5.

Obviously, the blanket ends could not be mounted in the bar 15 and the strips 25 while those parts occupy the position shown in Fig. 5. The present invention provides a method and means for enabling an operator to anchor the blanket ends in these blanket gripping elements and to tension the blanket while eliminating all except a very narrow unblanketed space at the surface of the cylinder. This method and means will now be described.

On the opposite ends of the cylinder plates 30 are mounted as by means of screws 31 and 32. Each of these plates is bored near one end to form a round hole 33, and a saw kerf 34 in each plate intersects the hole 33. A locking collar 35 is mounted in the hole 33 and is held against rotation or other movement by means of a bolt 36 extending through the plate across its saw kerf 34.

Collar 35 has an enlarged inner end which projects into a bore 37 in the cylinder. A concentric bore 38 of smaller diameter connects bore 37 with a smooth bore 39. A short shaft 40 has bearing in the collar 35 and in the bore 39 and projects inwardly into the cavity 12 where it carries a pinion 41. The outer end of the shaft is squared at 42 to receive a wrench. On its inner side collar 35 has three radial pockets 43, 44 and 45, and sleeve 46 pinned to shaft 40 has a tongue 47 projecting therefrom which is adapted to take into one or the other of these pockets and to be releasably held there by a coil spring 48.

Pinion 41 meshes with a rack 49 which is secured to the adjacent end of slide bar 15. As will be apparent when a wrench is applied to the outer end of shaft 40 and the shaft is pushed inwardly far enough to disengage tongue 47 from one of the pockets in the locking collar, the shaft may be turned, causing the pinion 41 to move the rack inwardly or outwardly as the case may be. Duplicate mechanism is provided at the opposite end of the cylinder, and both of the shafts 40 must be turned individually to move the slide bar to the desired point.

Figure 13:
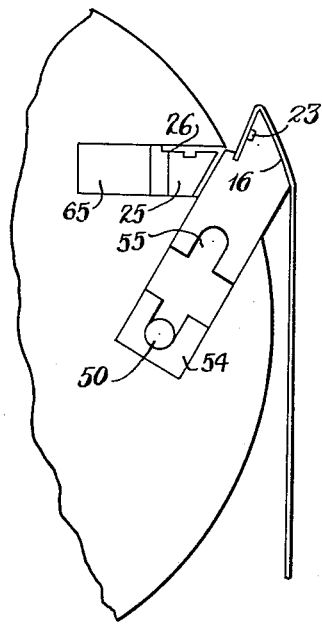

When a blanket is to be connected to slide bar 15 each of the shafts 40 is turned to the position of Fig. 9, when the pressure on the shaft is relieved and the spring 48 moves it outwardly, causing the tongue 47 to engage radial pocket 43, thus holding the rack and the bar in the extended position of Figs. 9 and 13. One end of the blanket may then be mounted in the slide bar 15, the groove 17 of which is then exposed. Next the operator will turn pinion 41 in the clockwise direction as viewed in Figs. 9 and 10, causing the rack and the slide bar to be retracted to their innermost positions shown in Figs. 10 and 14. As will be observed from Fig. 14 the slide bar 15 will then leave slot 13 uncovered. Also that end of the blanket will be lowered as compared with its position in Fig. 13, thus providing slack which will permit the blanket to be wound around the cylinder leaving some slack at the opposite end.

Figure 14:
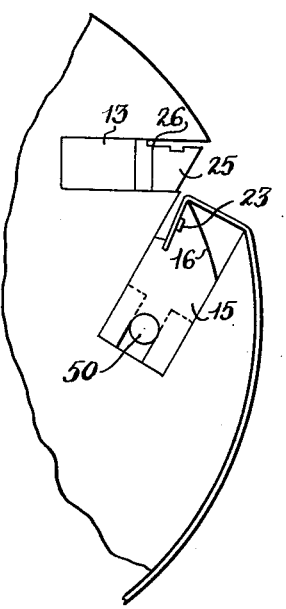
Figure 15:
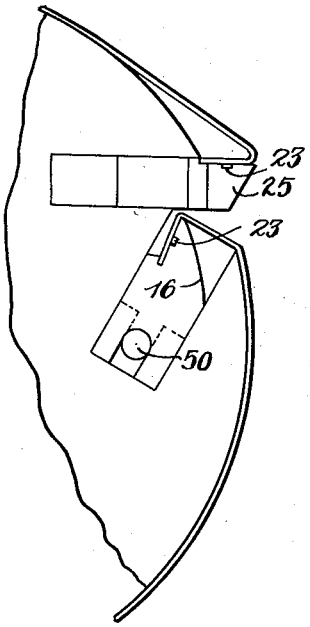
Figure 16:
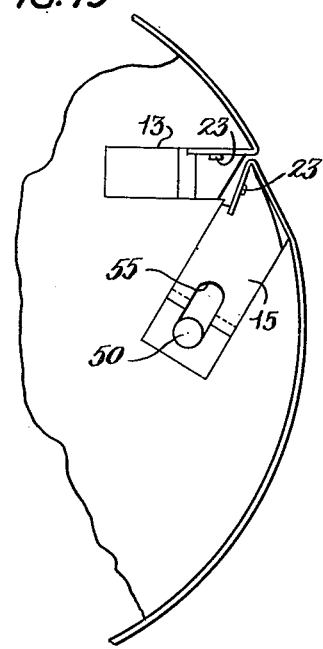
Figure 17:
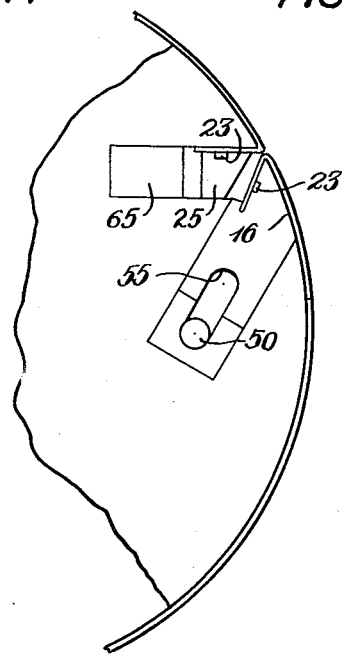

Now the the mounting strips 25 may be pulled out of the slot 13 from the position of Fig. 14 to that of Fig. 15, whereupon the bound and stapled extremity of the free end of the blanket is bent over and placed in the rabbet 26 with the staple legs 23 engaging the grooves 27. The mounting strips 25 and other parts connected therewith are then pushed into the slot 13, as illustrated in Fig. 16 and locked in that position. Now, since the bevelled faces of the strips 25 when so withdrawn clear the path of the slide bar 15, the operator may turn the short shafts 40 counterclockwise from their Fig. 10 position to their Fig. 11 position where the rack 49 and the slide bar 15 are moved outwardly to an intermediate position in which the slide bar is disposed with its outer end surface slightly beneath the surface of the cylinder. In this position the tongue 47 engages the pocket 45 in locking collar 35. This pocket is wider than the tongue 47. Tongue 47 engages one side wall of pocket 45, which of course remains in fixed position, and the shaft 40 with its pinion 41 and tongue 47 is prevented from turning clockwise, so that the rack 49 is locked against inward movement.

In accordance with the invention means is provided for forcing the slide bar outwardly from its Fig. 11 position to the flush position of Fig. 12. For this purpose there is provided mechanism as follows. Disposed in the bottom part of slot 14 there is a screw shaft 50, the opposite ends of which extend into bores 51 in the end walls of the cylinder beyond the cavities 12. The extremities of this screw shaft extend into sleeves 52 to which they are pinned, these sleeves having shaft extensions 53 formed on their outer extremities to receive a wrench. The shaft extensions 53 are journaled in the plates 30, at least one of which must be removed in order that the screw shaft may be mounted in the cylinder.

Slidable along the bottom of the slot 14 there are a series of wedge blocks 54 that are U-shaped in cross-section and carry nuts 56 that are threadably connected with the shaft. The slide bar 15 has a bottom groove 55 extending throughout its length, of a width to clear the shaft 50, so that when the slide bar is retracted fully it rests upon the base of the slot as in Figs. 10, 14 and 15. At intervals the lower portions of the slide bar on either side of its groove 55 are cut away as at 57 in Fig. 1 for distances slightly greater than the length of blocks 54, which leaves feet 58 that are adapted to straddle shaft 50 between blocks 54 and rest upon the bottom of the slot 14.

When a blanket end has been mounted in the slide bar 15 the operator before retracting the slide bar to the position of Fig. 10 places a wrench on either end of the screw shaft 50 and rotates that shaft in a direction to draw the wedge blocks 54 back from the positions they occupy in Fig. 1 to positions registering with the cutouts 57, this being necessary before the slide bar can be retracted to the position of Fig. 10. When the slide bar is in the position of Fig. 11 and it is desired to advance it to the Fig. 12 position, the operator turns screw shaft 50 in the opposite direction, causing the bevelled ends of the wedge blocks 54 to slide under the feet 58 and wedge the latter outwardly, which forces the slide bar outwardly to its flush position of Fig. 12, where the blanket is tensioned and covers the cylinder smoothly. This latter movement is accommodated in the locking collar 35 by reason of the width of pocket 45, that is the tongue 47 moves over to the opposite side of the pocket. Two snap rings 60 and 61 disposed in annular grooves in shaft 50 limit the movement of one of the wedge blocks 54, and thus prevents the operator from turning the shaft too far in either direction.

The means for mounting one end of the blanket in the slot 13 may be varied more or less so long as it comprises an element which may be pulled out of the slot sufficiently to receive the blanket end and so long as it may be retracted and locked within the slot and provided it clears the path of the slide bar 15. In accordance with the preferred arrangement this means comprises the anchoring strips 25 previously described. These strips are adjustably mounted on a bar 65 which extends substantially the entire length of the cylinder. This bar together with the strips 25 is referred to hereinafter as a mounting bar. The means for attaching strips 25 to bar 65 may comprise a pair of screws 66 for each strip that are threadably mounted in the bar 65 and by means of which the final tension of the blanket may be regulated, it being understood that this can be done only when the slide bar 15 is retracted to the position illustrated in Figs. 10, 14 and 15.

Bar 65 is provided with keyhole slots 67 at intervals throughout its length which receive headed screws 68 that are threadably mounted in the cylinder. To place the bar 65 in position it is so disposed endwise that screws 68 enter the large portions of the keyhole slots, after which the bar is moved endwise to the left, as viewed in Fig. 2, to bring the small ends of the slots beneath the heads of the screws. At each end of the bar 65 where it extends into a cavity 12, there is attached to it a yoke 70 by means of which it can be grasped by the operator or operators and moved inwardly or outwardly to a limited extent, the ends of the yoke forming stops which at one end of the cylinder engage a pin 71 mounted in the cylinder and at the other end engage a threaded shaft 72. These stops permit outward movement of the assembly to the Fig. 15 position. When the assembly has been pushed back into the slot and the bar 65 moved endwise to dispose it beneath the headed screws 68, it may be locked in that position by means of shaft 72 which is threadably mounted in the cylinder. For this purpose a knurled wheel 73 having a lateral hub 74 is pinned to the shaft, and when the screw shaft is turned to bring this hub into engagement with the yoke 70 at that end of the cylinder, accidental movement of the bar 65 is prevented.

Having thus described our invention, we claim:

1. The method of securing a flexible blanket to a cylinder in a manner to cover substantially the complete surface thereof, which comprises the steps of securing one end of the blanket to a lengthwise slide bar mounted in a bottomed chordal slot in the cylinder while the slide bar is projected outwardly beyond the surface of the cylinder, retracting the slide bar into the cylinder and below the surface thereof, winding the blanket around the outer edge of the bar and around the cylinder and securing the opposite end thereof in another slot in the cylinder disposed adjacent said slide bar at an acute angle thereto, and forcing said slide bar outwardly to tension the blanket and move the slide bar to a position flush with the surface of the cylinder, covering said other slot and bringing the two ends of the blanket together over the operating mechanism.

2. In the method defined in claim 1, the additional step of mounting the last named end of the blanket in a second bar while the latter is projected outwardly in said other slot beyond the surface of the cylinder and retracting said second bar into the cylinder and fastening it therein out of the path of the slide bar before the said slide bar is moved outwardly to tension the blanket and cover the said second bar and its slot.

3. In combination, a blanket cylinder having first and second chordal slots intersecting inwardly from the surface of the cylinder at an acute angle to each other, said slots having a common opening at the cylinder surface, a slide bar mounted in the first slot, means on the side of the slide bar adjacent the second slot for anchoring one end of the blanket, said slide bar being adapted to be retracted into the cylinder clear of the second slot, a mounting strip in the second slot adapted to anchor the other end of the blanket, said mounting strip when in blanket anchoring position clearing the first slot, said slide bar having an outer end surface conforming to the curvature of the cylinder, and means for extending it from its said retracted position to bring its outer surface into conformance with the surface of the cylinder, said slide bar when in the latter position closing off said second slot and bringing the two ends of the blanket together, and means for locking said slide bar and mounting strip in operative position.

4. Mechanism substantially as defined in claim 3, wherein means is provided for manipulating said slide bar inwardly and outwardly, which means is accessible from the ends of the cylinder while the mounting strip is in blanket securing position.

5. Mechanism substantially as defined in claim 3, wherein the locking means comprises means accessible from an end of the cylinder for forcing said slide bar outwardly into position flush with the cylinder surface.

6. Mechanism substantially as defined in claim 3, comprising means accessible from the ends of the cylinder for moving said slide bar outwardly beyond the surface of the cylinder in order to facilitate securing one end of the blanket thereto.

7. Mechanism substantially as defined in claim 3, comprising means accessible from the ends of the cylinder for moving said slide bar inwardly beyond the surface of the cylinder and latching it temporarily in that position.

8. Mechanism as defined in claim 3, comprising rack and pinion means for moving said slide bar outwardly beyond the surface of the cylinder to facilitate securing one end of the blanket thereto, inwardly to a position clearing the first slot and outwardly to an intermediate position slightly beneath the cylinder surface, and separate means for wedging said slide bar outwardly from its last named position to a position flush with the surface of the cylinder.

9. In combination, a blanket cylinder having two lengthwise bottomed chordal slots intersecting inwardly from a surface of the cylinder at an acute angle to each other, said slots having a common opening at the cylinder surface, means in one of said slots for anchoring one end of a blanket, blanket anchoring means mounted in the second slot comprising an elongated slide bar extending substantially across the cylinder, said slide bar having an outer surface conforming to the curvature of the cylinder, rack and pinion means for moving said slide bar outwardly beyond the surface of the cylinder to facilitate securing the other end of the blanket thereto, inwardly to a position clearing the first named slot and outwardly to a position near the cylinder surface, means for latching said slide bar in said three different positions, and means for moving said slide bar outwardly to a position flush with the cylinder surface.

10. In combination, a blanket cylinder having two lengthwise bottomed chordal slots intersecting inwardly from the surface of the cylinder at an acute angle to each other, said slots having a common opening at the surface of the cylinder, means disposed in one of said slots for anchoring one end of a blanket therein, a slide bar in the second slot having an outer surface conforming to the curvature of the cylinder and movable outwardly beyond the surface of the cylinder to facilitate securing the other end of the blanket to the outer end of the bar, inwardly to a position clearing the first slot and outwardly to an intermediate position slightly beneath the surface of the cylinder, means for latching said slide bar against inward movement from said intermediate position, and means for forcing said slide bar outwardly from said intermediate position to a position flush with the cylinder surface and covering the said opening.

11. Mechanism as defined in claim 10, wherein means is provided for moving said slide bar outwardly and comprises a slidable and rotatable shaft, a fixed collar surrounding said shaft having a pocket therein, and a tongue on said shaft adapted to engage said pocket for holding the shaft against rotation in the direction corresponding to the retraction of said slide bar, said pocket being of an angular dimension which permits the tongue to turn sufficiently to acccommodate the movement of the slide bar from intermediate position to the position flush with the cylinder surface.

12. Mechanism as defined in claim 8, comprising lock means for holding said slide bar against inward movement from its outermost position and against outward movement from its innermost and intermediate positions, said lock means permitting the outward movement of said slide bar to said flush position.

13. In combination, a blanket cylinder having a slot extending inwardly from the surface of the cylinder, blanket anchoring means mounted in said slot comprising an elongated mounting bar extending substantially across the cylinder, said bar having longitudinally disposed keyhole slots therein, headed fastenings mounted in said cylinder engaging said keyhole slots, whereby the bar may be secured to the cylinder by crosswise movement therein, a blanket anchor strip carried by said mounting bar, means for adjusting said strip toward or away from said bar, and means for locking said bar in operative position.

14. In a machine of the character described, a flexible blanket, a metal binding extending over an end edge of said banket, and metal staples disposed parallel to the edge of the blanket and extending through the blanket and said binding, said staples being spaced apart and forming conjointly an aligned projecting abutment and blanket gripping means comprising a bar having a groove therein receiving said staples.

15. Mechanism as defined in claim 8, wherein said rack and pinion means are disposed at both ends of the cylinder for moving each end of the slide bar individually inwardly and outwardly, a short shaft carried by the cylinder upon which each pinion is mounted, a fixed locking collar surrounding said shaft and having radial pockets therein, a tongue on the shaft adapted to engage one or the other of said pockets, spring means bearing endwise on the shaft tending to hold said tongue in one of said pockets and to release the tongue when the shaft is moved endwise against the force of the spring, means for turning said shafts, a screw shaft extending entirely across the cylinder, wedges threadably mounted on said screw shaft, projections on said slide bar adapted to be engaged by said wedges, and means for turning said last named shaft to force the slide bar into position flush with the surface of the cylinder.

References Cited in the file of this patent
UNITED STATES PATENTS

| | | |
|---|---|---|
| 890,759 | Dick | June 16, 1908 |
| 1,016,511 | Mitchell | Feb. 6, 1912 |
| 1,286,684 | McCracken | Dec. 3, 1918 |
| 1,362,100 | Henderson | Dec. 14, 1920 |
| 1,662,284 | Shea | Mar. 13, 1928 |
| 1,730,122 | Busk | Oct. 1, 1929 |
| 1,739,585 | Fleming | Dec. 17, 1929 |
| 1,827,300 | Orucgard et al. | Oct. 13, 1931 |
| 1,937,119 | Kranz | Nov. 28, 1933 |
| 1,966,121 | Hotchkiss | July 10, 1934 |
| 2,105,452 | Busk | Jan. 11, 1938 |
| 2,157,621 | Neilson | May 9, 1939 |
| 2,231,291 | Morrison | Feb. 11, 1941 |
| 2,541,254 | Huch et al. | Feb. 13, 1951 |
| 2,599,417 | Seed | June 3, 1952 |
| 2,714,852 | Stempel | Aug. 9, 1955 |